United States Patent
Auernhammer et al.

(10) Patent No.: US 9,785,580 B2
(45) Date of Patent: Oct. 10, 2017

(54) BRIDGE AND METHOD FOR COUPLING A REQUESTING INTERCONNECT AND A SERVING INTERCONNECT IN A COMPUTER SYSTEM

(71) Applicant: International Business Machines Corporation, Armonk, NY (US)

(72) Inventors: Florian A. Auernhammer, Rueschlikon (CH); Joseph G. McDonald, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 394 days.

(21) Appl. No.: 14/600,568

(22) Filed: Jan. 20, 2015

(65) Prior Publication Data

US 2015/0220469 A1    Aug. 6, 2015

(30) Foreign Application Priority Data

Jan. 31, 2014    (GB) .................................. 1401669.5

(51) Int. Cl.
*G06F 13/16*     (2006.01)
*G06F 13/362*    (2006.01)
(Continued)

(52) U.S. Cl.
CPC ...... *G06F 13/1642* (2013.01); *G06F 13/1673* (2013.01); *G06F 13/362* (2013.01);
(Continued)

(58) Field of Classification Search
CPC ...... G06F 13/14; G06F 13/16; G06F 13/1621; G06F 13/1626; G06F 13/1642;
(Continued)

(56) References Cited

U.S. PATENT DOCUMENTS 5,819,053 A * 10/1998 Goodrum .............. G06F 11/349
                                                      710/100
5,857,086 A *  1/1999 Horan .................. G06F 13/4027
                                                      345/503

(Continued)

FOREIGN PATENT DOCUMENTS

WO            9532475 A1    11/1995

OTHER PUBLICATIONS

List of IBM Patents or Patent Applications Treated as Related; CH920130079US1; Jan. 20, 2015, pp. 1-2.

(Continued)

*Primary Examiner* — Thomas J Cleary
(74) *Attorney, Agent, or Firm* — Cantor Colburn LLP

(57) ABSTRACT

A bridge for coupling a requesting interconnect and a serving interconnect connected to a number of coherent units in a computer system includes N machines configured to handle requests from the requesting interconnect and for handling allocated responses from the serving interconnect, wherein each of the N machines has an allocated local count; a tracking entity configured to track priorities of the N machines for issuing received requests to the serving interconnect and for issuing received responses to the requesting interconnect based on the N local counts; a first arbiter configured to arbitrate the received requests to be issued to the serving interconnect based on the tracked priorities; and a second arbiter configured to arbitrate the received responses to be issued to the requesting interconnect based on the tracked priorities.

12 Claims, 10 Drawing Sheets

(51) Int. Cl.
*G06F 13/40* (2006.01)
*G06F 13/376* (2006.01)
*G06F 13/42* (2006.01)

(52) U.S. Cl.
CPC ........ *G06F 13/4031* (2013.01); *G06F 13/376* (2013.01); *G06F 13/4068* (2013.01); *G06F 13/4221* (2013.01)

(58) Field of Classification Search
CPC ............. G06F 13/1673; G06F 13/4004; G06F 13/4013; G06F 13/4027; G06F 13/4036; G06F 13/4068; G06F 9/3836; G06F 9/3838; G06F 9/3842; G06F 9/3855; G06F 9/3857; G06F 9/3859; G06F 9/3861; G06F 13/362; G06F 13/4031
See application file for complete search history.

(56) References Cited

U.S. PATENT DOCUMENTS

| | | | |
|---|---|---|---|
| 7,426,621 | B2 | 9/2008 | Kommrusch et al. |
| 7,600,078 | B1 | 10/2009 | Cen et al. |
| 7,990,999 | B2 | 8/2011 | Lee et al. |
| 7,996,625 | B2 | 8/2011 | Khare et al. |
| 2002/0120799 | A1 | 8/2002 | Shah |
| 2004/0017804 | A1* | 1/2004 | Vishnu ................ H04L 12/5601 370/386 |
| 2004/0225822 | A1 | 11/2004 | Takeda et al. |
| 2011/0010480 | A1 | 1/2011 | Auernhammer |
| 2011/0185102 | A1* | 7/2011 | Deogharia .......... G06F 13/4059 710/309 |
| 2013/0086586 | A1* | 4/2013 | Lakshmana-murthy ............... G06F 15/7864 718/100 |
| 2015/0220461 | A1 | 8/2015 | Auernhammer et al. |
| 2015/0286591 | A1* | 10/2015 | Auernhammer .... G06F 13/1642 710/310 |
| 2015/0286592 | A1* | 10/2015 | Auernhammer ...... G06F 13/376 710/310 |

OTHER PUBLICATIONS

UK Intellectual Property Office, Application No. GB1401669.5, Patents Act 1977: Search Report under Section 17(5), Date Mailed: Jul. 29, 2014, pp. 1-3.

Florian A. Auernhammer, et al.,"Bridge and Method for Coupling a Requesting Interconnect and a Serving Interconnect in a Computer System," U.S. Appl. No. 14/744,376, filed Jun. 19, 2015.

Florian A. Auernhammer, et al.,"Bridge and Method for Coupling a Requesting Interconnect and a Serving Interconnect in a Computer System," U.S. Appl. No. 14/744,379, filed Jun. 19, 2015.

List of IBM Patents or Patent Applications Treated as Related; CH920130079US1;Date File: Jan. 20, 2015, pp. 1-2.

* cited by examiner

Fig. 1 – Prior Art

BRIDGE AND METHOD FOR COUPLING A REQUESTING INTERCONNECT AND A SERVING INTERCONNECT IN A COMPUTER SYSTEM

FOREIGN PRIORITY

This application claims priority to Great Britain Patent Application No. 1401669.5, filed Jan. 31, 2014, and all the benefits accruing therefrom under 35 U.S.C. §119, the contents of which in its entirety are herein incorporated by reference.

BACKGROUND

The invention relates to a bridge for coupling a requesting interconnect and a serving interconnect connected to a number of coherent units in a computer system. Moreover, the present invention relates to a method and to a computer program for coupling a requesting interconnect and a serving interconnect connected to a number of coherent units in a computer system.

The present bridge is configured to provide a load/store path for inbound requests between interconnects with ordering requirements. For example, the bridge may be arranged between an I/O bus, like PCI Express, as a requesting interconnect on a requesting side (also called south) and a serving interconnect, e.g., a snooping-based coherent interconnect, on a serving side (also called north).

I/O devices or I/O buses, like PCI Express, are based on strong ordering requirements, defining that in particular read requests may not pass write requests that were issued ahead of the read request. As a result, the read request is guaranteed to not receive stale information in case it would access the same data that is modified by a previous write request.

In this regard, FIG. 1 shows a schematic block diagram of an example of a bridge 10 coupling an I/O device 200 and a coherent processor interconnect 300. The coherent processor interconnect 300 couples a plurality of processing units 401 to 404 and a memory controller 500, for instance.

The coherent processor interconnect 300 may be a snooping-based coherent interconnect which may include the possibility for a request (command) to be retried. The necessity of a retry may be caused by missing resources in the coherent units 401-404, 500 attached to the coherent processor interconnect 300 and potentially responsible to handle the request, e.g., when all the request queues of the memory controller 500 are already taken by other requests, or by address conflicts when a request for the address is currently already being processed in the coherent processor interconnect 300 and the address is protected against other operations of the coherent units 401-404, 500, 100 involved in the transfer.

Depending on the implementation of the logic of the bridge 10 attached to the I/O device 200—which may also be called south interface—also the responses returned for load requests from the south interface 200 may require retries when the logic of the bridge runs out of buffer space, e.g., because of delayed credit returns between the I/O bridge 11 and the I/O host stack 12.

Moreover, a bridge as shown in FIG. 1 for handling loads or writes from the I/O device 200 may have to support strong ordering requirements of write requests and also read requests. The read and write requests (load and store requests) are received by the bridge at its south interface.

In particular, for good performance, it may be critical that the read requests are kept in order as well as possible in order to avoid head of line blocking for the southbound read responses. For example, in PCI Express, e.g., the maximum transfer unit (MTU) sized data responses need to be returned in order. This means that, for example, for a 4 kB read request, and a read response MTU of 256 B, there are 16 response packets created, requiring 64 or 32 reads on the coherent interconnect, depending on the cache line's size that is typically 64 or 128 bytes.

Any cache lines that are returned on the southbound interface ahead of the 2 or 4 cache lines required for assembling the first response packet while any of this data is already available incurs additional latency and blocks buffers in the southbound interconnect from being reused for new requests.

Without the possibility of and without different response latencies in the coherent interconnect, a simple FIFO (First-In-First-Out) implementation may be used. As there can however be any combination of varying latencies and potential retries, a FIFO implementation that can keep the optimal scheduling order is too complex to implement with an increasing number of machines. Another option may be using bit vectors for tracking the ordering between all machines. This implementation however scales exponentially with the number of active machines (also instantiated machines), which makes it prohibitive to implement with the increasing bandwidth requirements.

Document U.S. Pat. No. 7,996,625 B2 describes a method for reducing memory latency in a multi-node architecture. A speculative read request is issued to a home node before results of a cache coherence protocol are determined. The home node initiates a read to memory to complete the speculative read request. Results of a cache coherence protocol may be determined by a coherence agent to resolve cache coherency after the speculative read request is issued.

Document U.S. Pat. No. 7,600,078 B1 describes a method for speculatively performing read transactions. The method includes speculatively providing a read request to a memory controller associated with a processor, determining coherency of the read request in parallel with obtaining data of the speculatively provided read request, and providing the data of the speculatively provided read request to the processor if the read request is coherent. In this way, data may be used by a processor with a reduced latency.

Accordingly, it is an aspect of the present invention to improve bridging between a requesting interconnect, like an I/O bus, and a serving interconnect, like a processor interconnect.

SUMMARY

In one embodiment, a bridge for coupling a requesting interconnect and a serving interconnect connected to a number of coherent units in a computer system includes N machines configured to handle requests from the requesting interconnect and for handling allocated responses from the serving interconnect, wherein each of the N machines has an allocated local count; a tracking entity configured to track priorities of the N machines for issuing received requests to the serving interconnect and for issuing received responses to the requesting interconnect based on the N local counts; a first arbiter configured to arbitrate the received requests to be issued to the serving interconnect based on the tracked priorities; and a second arbiter configured to arbitrate the received responses to be issued to the requesting interconnect based on the tracked priorities.

In another embodiment, a method for coupling a requesting interconnect and a serving interconnect connected to a number of coherent units in a computer system by a bridge, the bridge having N machines for handling requests from the requesting interconnect and for handling allocated responses from the serving interconnect includes allocating a local count to each of the N machines; tracking priorities of the N machines for issuing received requests to the serving interconnect and for issuing received responses to the requesting interconnect based on the N local counts; arbitrating the received requests to be issued to the serving interconnect based on the tracked priorities; and arbitrating the received responses to be issued to the requesting interconnect based on the tracked priorities.

BRIEF DESCRIPTION OF THE DRAWINGS

Similar or functionally similar elements in the figures have been allocated the same reference signs if not otherwise indicated.

DETAILED DESCRIPTION

Figure 1:
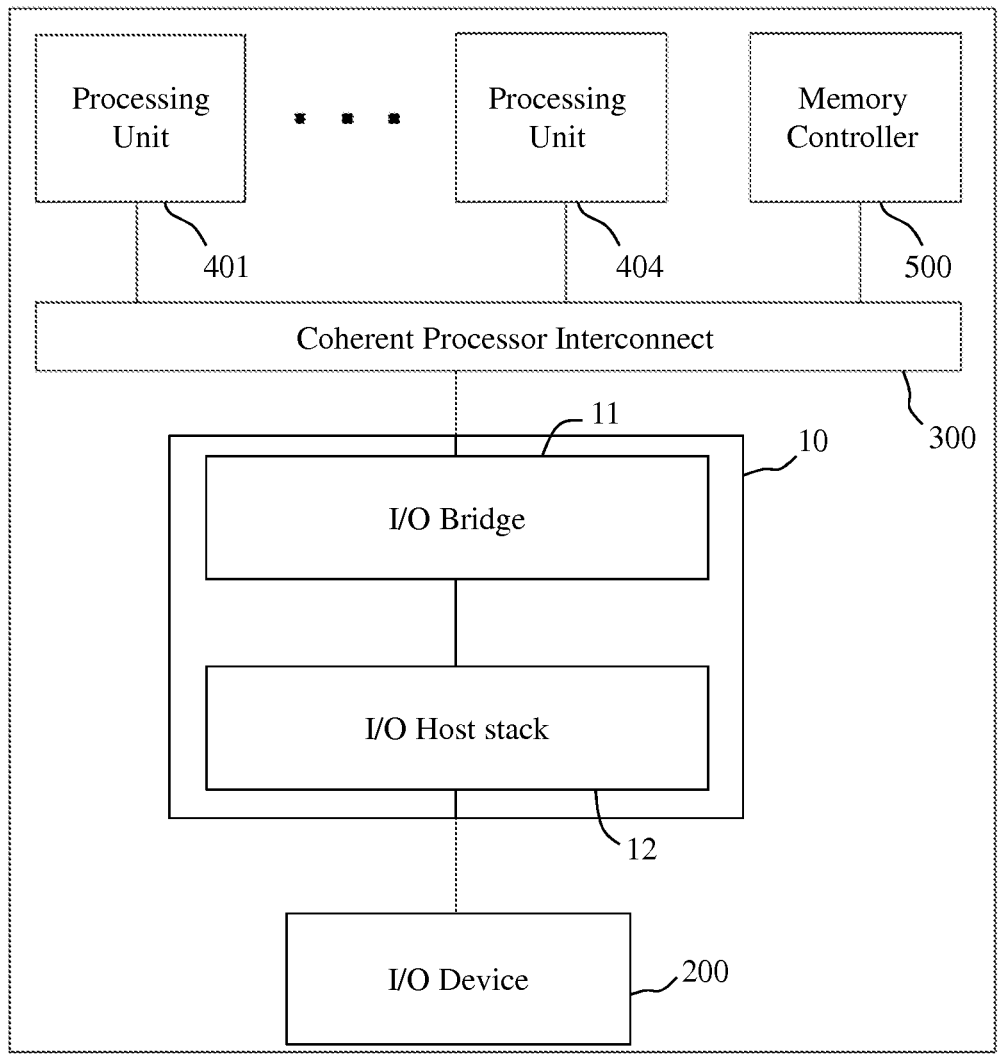
FIG. 1 shows a schematic block diagram of a conventional bridge coupling an I/O device and a coherent interconnect.

According to a first aspect, a bridge for coupling a requesting interconnect and a serving interconnect connected to a number of coherent units in a computer system is suggested. The bridge includes N machines, a tracking entity, a first arbiter, and a second arbiter. Each of the N machines is configured to handle requests from the requesting interconnect and to handle allocated responses from the serving interconnect. Each of the N machines has an allocated local count. The tracking entity is configured to track priorities of the N machines for issuing received requests to the serving interconnect and for issuing received responses to the requesting interconnect based on the N local counts. The first arbiter is configured to arbitrate the received requests to be issued to the serving interconnect based on the tracked priorities. Further, the second arbiter is configured to arbitrate the received responses to be issued to the requesting interconnect based on the tracked priorities.

The present bridge improves the ordering for requests, for example for read requests, both on its first interface to the requesting interconnect and on its second interface to the serving interconnect, while supporting retries for requests on both interfaces using a counter mechanism based on the local counts, that scales linearly in terms of resource requirements with the number of active machines.

Advantageously, both the first arbiter and second arbiter use the tracked priorities which are based on the same set of local counts.

According to some implementations, the requesting interconnect may be an I/O device or I/O bus. Further, the serving interconnect may be a processor interconnect, in particular a coherent processor interconnect, e.g. a snooping based coherent interconnect.

In an embodiment, the tracking entity is configured to track the priorities of the N machines for issuing the received requests to the serving interconnect and for issuing the received responses to the requesting interconnect based on the N local counts and a status of each of the N machines.

Advantageously, the tracking entity uses not only the N local counts but also the N status of the machines for tracking the priorities. For example, a machine having a status "waiting for data" may not be considered for one of the arbiters.

In a further embodiment, the N local counts of the N machines are embodied as N consecutive numbers.

For example, if the bridge includes sixteen machines (with N=8 and M=8), the local counts are 0, 1, 2, 3, 4, 5, 6, 7, 8, 9, 10, 11, 12, 13, 14 and 15. N is an integer greater than or equal to one (N≥1). M is an integer greater than or equal to one (M≥1).

In a further embodiment, the bridge includes an issuer for controlling the N machines in order to issue the received requests to the serving interconnect and to issue the received responses to the requesting interconnect. The issuer may include the first arbiter and the second arbiter.

Furthermore, the issuer may be embodied as or may comprise a controller, for example a microcontroller. The issuer may be configured to implement ordering requirements of write requests and read requests, in particular strong ordering requirements, e.g. Rd-after-Wr ordering and Wr ordering. For example, a read acknowledgement is an acknowledgement of the serving interconnect for an issued read request. It may be also called a positive response or a combined response. In an analogous way, a write acknowledgement may be an acknowledgement of the serving interconnect for an issued write request.

In a further embodiment, the bridge includes a plurality of read machines for handling read requests received at the first interface, and for handling read responses received at the north interconnect.

In a further embodiment, the bridge includes a plurality of write machines for handling write requests received at the first interface, and for handling write responses received at the north interconnect.

For example, a read machine is coupled to the issuer and therefore controlled by the issuer. The read machine itself controls an allocated read data buffer coupled between the read buffers of the first interconnect (south interconnect) and the second interconnect (north interconnect) of the bridge.

Also the respective write machine may be controlled by the issuer. Thus, the issuer may implement a write ordering scheme. The respective write machine controls a write data buffer coupled between the write data buffers of the south interface and the north interface.

In a further embodiment, the issuer is configured to control the plurality of read machines and the plurality of write machines. For example, the issuer is the central control entity of the bridge.

In a further embodiment, the bridge includes a master count unit for providing a master count being based on a number of active machines of the N machines, in particular corresponding to the number of active machines of the N machines.

In particular, the bridge includes one single master count unit for providing one single master count in the bridge.

In a further embodiment, the bridge includes two master counts, one that is used by read machines, and one that is used by write machines.

In a further embodiment, the issuer includes a local count unit for each of the N machines, wherein the local count unit is configured to set the local count for its associated machine, if it is used for a new request, to a counter value of the master count.

In a further embodiment, the master count unit is configured, in case of receiving no machine release signal and receiving a new request at one time, to source a counter value corresponding to the master count to the local count unit associated to the machine used for the new request and to increment the master count by one subsequently.

In a further embodiment, the master count unit is further configured, in case of receiving a machine release signal and no new request at one time, to decrement the master count by one.

In a further embodiment, the master count unit is further configured, in case of receiving a machine release signal and a new request at one time, to source a counter value corresponding to the master count decremented by one to the local count unit associated to the machine used for the new request.

In a further embodiment, the local count unit is configured, after it set its local count to the counter value of the master count, to detect machine release signals and, if the counter value of a detected machine release signal is smaller than its local count, to decrease its local count by one.

In a further embodiment, the machine being allocated to a new request is configured to transmit a request valid signal to the first arbiter after resolving all dependencies of the new request. Such dependencies may be write requests that the read request depends on.

In a further embodiment, the machine is further configured to keep the request valid signal active until it is selected by the first arbiter for issuing the new request on the serving interconnect.

In a further embodiment, the machine is configured to reset the request valid signal, if it is selected by the first arbiter, and further configured to wait for the allocated response from the serving interconnect subsequently.

In a further embodiment, the machine is configured, after receiving an acknowledgement and allocated data for the issued request from the serving interconnect, to transmit a response valid signal to the second arbiter.

In a further embodiment, the machine is further configured, after receiving a negative-acknowledgement for the issued request from the serving interconnect, to set the request valid signal again.

In a further embodiment, the first arbiter is configured to select the machine having the lowest local count in the tracking entity and an active request valid signal.

In a further embodiment, the first arbiter is configured to select the machine having the lowest local count in the tracking entity, an active request valid signal, and that in addition matches a subgroup selection signal provided by the requesting machine, e.g., for allowing prioritisation of control data requests e.g., for address translation data needed by the I/O bridge over normal DMA read payload requests for I/O device requests.

In a further embodiment, the second arbiter is configured to select the machine having the lowest local count in the tracking entity and an active response valid signal.

In a further embodiment, the tracking entity includes a table having N rows for the N machines and at least two columns, wherein, in each of the N rows, the local count of the machine is stored in a column, and the status of the machine is stored in a further column.

For example, the tracking entity includes a table having N rows for the N machines and three columns, wherein, in each of the N rows, a machine number of one of the N machines is stored in the first column, the local count of the machine is stored in the second column, and the status of the machine is stored in the third column.

In a further embodiment, the bridge includes a first interface which is configured to connect the bridge with the requesting interconnect.

In a further embodiment, the first interface includes a first buffer for buffering write data received from the requesting interconnect, a second buffer for buffering read requests and write requests received from the requesting interconnect and being coupled to the issuer, a third buffer for buffering read responses and a fourth buffer for buffering read data received from the serving interconnect.

In a further embodiment, the bridge includes a second interface which is configured to connect the bridge with the serving interconnect.

In a further embodiment, the second interface includes a first buffer for buffering write data for the serving interconnect, a second buffer for buffering read requests and write requests issued for the serving interconnect, a third buffer for buffering read responses and write responses received from the serving interconnect and a fourth buffer for buffering read data received from the serving interconnect.

In a further embodiment, the issuer is configured to re-issue the issued read request, if a read acknowledgment allocated to the issued read request is not received from the serving interconnect.

For example, the issuer may re-issue the issued read request immediately, if the respective read acknowledgement is not received. Therefore, the present issuer may provide an eager retry or eager retrying mode.

In a further embodiment, for each of the read machines, the bridge includes a read data buffer coupled between the fourth buffer of the first interface and the fourth buffer of the second interface, wherein the read data buffer is configured to provide read data received from the serving interconnect in response to the issued read request to the requesting interconnect, if a read acknowledgment for the issued read request and all write acknowledgments for the issued dependent write requests are received from the serving interconnect.

In a further embodiment, the issuer is configured to re-issue the issued read request, if not all write acknowledgments allocated to the issued dependent write requests are received from the serving interconnect.

In a further embodiment, the issuer is configured to re-issue the issued read request immediately or after all write acknowledgments for the issued dependent write requests are received from the serving interconnect. To decide on re-issuing the issued read request, the issuer may use a certain decision.

In this example, the issuer may select to use an eager retrying scheme or a conservative retrying scheme, in particular in dependence on load and/or conflict issues.

In a further embodiment, the bridge includes a decider for making the certain decision in dependence on an actual load at the serving interconnect and/or on an occurrence of a conflict between the issued read request and one of the issued dependent write requests.

The respective entity, e.g., the first arbiter, the second arbiter, the issuer or the decider, may be implemented in hardware and/or in software. If the entity is implemented in hardware, it may be embodied as a device, e.g., as a computer or as a processor or as a part of a system, e.g., a computer system. If the entity is implemented in software it may be embodied as a computer program product, as a function, as a routine, as a program code or as an executable object.

Any embodiment of the first aspect may be combined with any embodiment of the first aspect to obtain another embodiment of the first aspect.

According to a second aspect, a system is suggested which includes a requesting interconnect, like an I/O device, a serving interconnect, like a processor interconnect, and a bridge of the above-mentioned first aspect for coupling the requesting interconnect and the serving interconnect.

According to a third aspect, a method for coupling a requesting interconnect and a serving interconnect connected to a number of coherent units in a computer system by a bridge of the above-mentioned first aspect is suggested.

The method includes the following operations:

In a first operation, a local count is allocated to each of the N machines. In a second operation, the priorities of the N machines for issuing received requests to the serving interconnect and for issuing received responses to the requesting interconnect are tracked based on the N local counts. In a third operation, the received requests to be issued to the serving interconnect are arbitrated based on the tracked priorities. In a fourth operation, the received responses to be issued to the serving interconnect are arbitrated based on the tracked priorities.

According to a fourth aspect, the invention relates to a computer program comprising a program code for executing the method of the third aspect for coupling a requesting interconnect and a serving interconnect when run on at least one computer.

In the following, exemplary embodiments of the present invention are described with reference to the enclosed figures.

Figure 2:
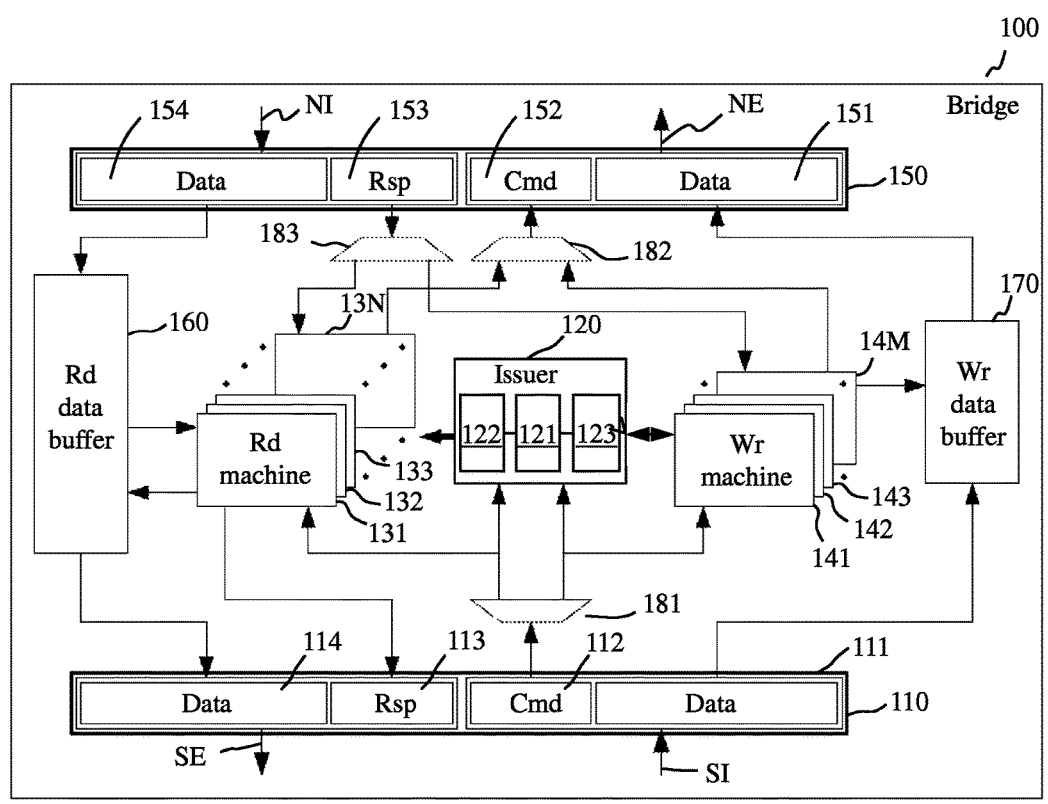
FIG. 2 shows a schematic block diagram of a first embodiment of a bridge for coupling a requesting interconnect and a serving interconnect.

Referring now to FIG. 2, a schematic block diagram of an embodiment of a bridge 100 for coupling a requesting interconnect 200 and a serving interconnect 300 is depicted. For example, the requesting interconnect 200 may be an I/O device and the serving interconnect 300 may be a coherent processor interconnect 300 as exemplarily shown in FIG. 1. The coherent units 401-404, 500 may include a number of processing units 401-404 and a number of memory controllers 500 (see FIG. 1). The bridge 100 of FIG. 1 includes a first interface 110 which is configured to connect the bridge 100 with the requesting interconnect 200, an issuer 120, a number of read (Rd) machines 131-13N, a number of write (Wr) machines 141-14M, a second interface 150 which is configured to connect the bridge 100 with the serving interconnect 300, a read (Rd) data buffer 160 for each of the Rd machines 131-13N and a write (Wr) data buffer 170 for each of the Wr machines 141-14M.

Regarding the Rd machines 131-13N, N is an integer greater than or equal to 1 (N≥1). Regarding the Wr machines 141-14M, M is an integer greater than or equal to 1 (M≥1). Further, in FIG. 1, data refers to write data transferred from the requesting interconnect 200 to the serving interconnect 300 or to read data transferred from the serving interconnect 300 to the requesting interconnect 200. Further, Rsp refers to responses like write acknowledgments or read acknowledgments, Cmd refers to commands like read (Rd) requests or write (Wr) requests. Rd refers to read and Wr refers to write. Furthermore, SI refers to south ingress, i.e., an input coupled to the requesting interface 200. Further, SE refers to south egress, i.e., an output coupled to the requesting interface 200. In an analogous way, NE refers to north egress, i.e., an output coupled to the serving interface 300. Moreover, NI refers to the north ingress, an input coupled to the serving interface 300.

The first interface 110 includes a first buffer 111 for buffering write data received from the requesting interconnect 200, a second buffer 112 for buffering read requests and write requests received from the requesting interconnect 200, a third buffer 113 for buffering read responses like acknowledgments and a fourth buffer 114 for buffering read data received from the serving interconnect 300.

Furthermore, the second interface 150 includes a first buffer 151 for buffering write data for the serving interconnect 300, a second buffer 152 for buffering read requests and write requests issued to the serving interconnect 300, a third buffer 153 for buffering read responses and write responses received from the serving interconnect 300 and a fourth buffer 154 for buffering read data received from the serving interconnect 300. The issuer 120 is coupled to the second buffer 112 of the first interface 110 by a multiplexer 181 separating read requests for the read machines 131-13N and write requests for the write machines 141-14M.

Further, the multiplexer 182 couples the read machines 131-13N and the write machines 141-14M with the second buffer 152 of the second interface 150 for issuing the write and read requests to the serving interface 120. Moreover, the multiplexer 183 couples the third buffer 153 of the second interface 150 with the read machines 131-13N and write machines 141-14M for transferring read acknowledgments and write acknowledgments received from the serving interconnect 300. Further, the first interface 110 may be configured to receive a read request and a number of write requests that the read request depends on from the requesting interconnect 200 via the first interface 110.

The issuer 120 may be configured to issue the received number of dependent write requests to the serving interconnect 300 via the second interface 150. Further, the issuer 120 may be configured to issue the received read request to the serving interconnect 300 via the second interface 150 after having issued the number of dependent write requests and before receiving write acknowledgments for the issued dependent write requests from the serving interconnect 300.

Because the issuer 120 issues the read requests before receiving write acknowledgments of the dependent write requests, the present scheme may also be called speculative read scheme, speculative read or speculative read issuing. If a read acknowledgment for the issued read request is not received from the serving interconnect 300, the issuer 120 may be configured to re-issue the issued read request.

Moreover, the read data buffer 160 may be configured to provide read data received from the serving interconnect 300 in response to the issued read request to the requesting interconnect 200 if a read acknowledgment for the issued read request and all write acknowledgments for the issued dependent write requests are received from the serving interconnect 300. Further, the issuer 120 may re-issue the issued read request, if not all the write acknowledgments for the issued dependent write requests are received from the serving interconnect 300.

Based on a certain decision, the issuer 120 may re-issue the issued read request immediately or alternatively after all write acknowledgments for the issued dependent write requests are received from the serving interconnect 300. In this regard, the issuer 120 may comprise a decider which is configured to make the certain decision in dependence on an actual load at the serving interconnect 300 and/or on an occurrence of a conflict between the issued read request and one of the issued dependent write requests.

The present issuer 120 may control the issuing of the read requests and the dependent write requests based on strong ordering requirements. As mentioned above, a main ordering requirement may be that a read request is only issued after write requests being dependent on the read request are issued. A further ordering requirement may be implemented by the present issuer 120 regarding issuing certain write requests before other write requests. All these ordering requirements may be implemented in the issuer 120 so that the issuer 120 may control the read machines 131-13N and the write machines 141-14M accordingly.

As further shown in FIG. 2, the issuer 120 includes a tracking entity 121, a first arbiter 122 and a second arbiter 123. The tracking entity 121 may be embodied as one unit or may be embodied as a distributed system in the bridge 100. The tracking entity 121 is configured to track priorities of the N machines, the read machines 131-13N and the write machines 141-14M, for issuing received requests to the serving interconnect 200 and for issuing received responses to the requesting interconnect 300 based on N local counts lc (see e.g., FIG. 3) of the N machines. That means each of the N machines 131-13N, 141-14M has its own allocated local count lc. In particular, the N local counts lc of the N machines 131-13N, 141-14M are embodied as N consecutive numbers. For example, if the bridge 100 includes 16 machines 131-13N, 141-14M (with N=8 and M=8), the local counts lc may be: 0, 1, 2, 3, 4, 5, 6, 7, 8, 9, 10, 11, 12, 13, 14, and 15.

Furthermore, the tracking entity 121 may be adapted to track the priorities of the N machines 131-13N, 141-14M based on the N local counts lc and the status of each of the N machines 131-13N, 141-14M. For example, the status may indicate that the respective machine is ready to issue a request, is waiting for data, is ready to retry an issued request, is ready to issue a response or is ready to retry a response.

As indicated above, the tracking entity 121 may also be embodied as a distributed system and may not be part of the issuer 120 (not shown in FIG. 2). Further, the tracking entity 121 may be partially part of the issuer 120. The first arbiter 122 is configured to arbitrate the received requests to be issued for the serving interconnect 120 based on the tracked priorities. Also, the second arbiter 123 is configured to arbitrate the received responses to be issued to the requesting interconnect 200 based on the tracked priorities. As a result, both the first arbiter 122 and the second arbiter 123 work on the same set of tracked priorities, in particular simultaneously.

Figure 3:
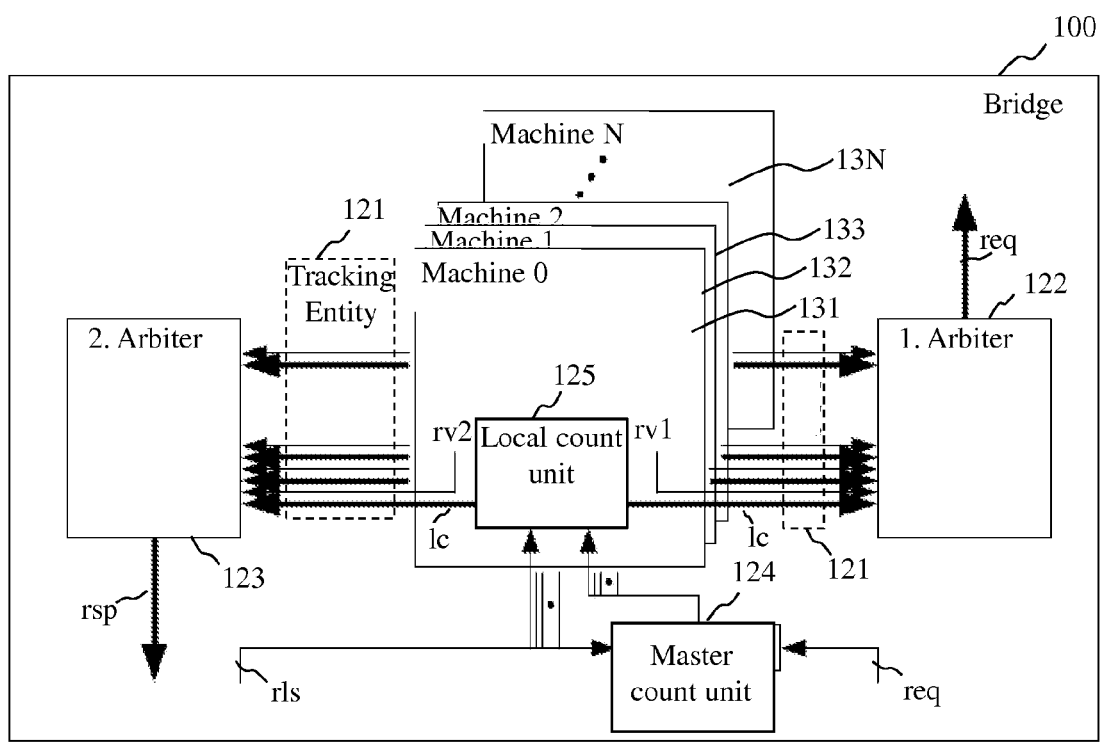
FIG. 3 shows a schematic block diagram of a second embodiment of a bridge for coupling a requesting interconnect and a serving interconnect.

FIG. 3 shows a schematic block diagram of a second embodiment of a bridge 100 for coupling a requesting interconnect 200 and a serving interconnect 300. For illustration reasons, FIG. 3 only shows N machines 131-13N, for example the read machines 131-13N, the tracking entity 121 as a distributed system, the first arbiter 122, the second arbiter 123, a master count unit 124 and a local count unit 125. It may be noted that the bridge 100 comprises one master count unit 124 and N local count units 125. That means that every machine 131-13N has its own allocated local count unit 125.

The master count unit 124 is configured to provide a master count mc. The master count mc may correspond to the number of active machines of the N machines 131-13N. The respective local count unit 125 of the respective N machines 131-13N is configured to set the local count lc for its associated machine 131-13N to a counter value of the master count mc, if the associated machine 131-13N is used for a new request received at the first interface 110.

Furthermore, the master count unit 124 may be configured for the following three different cases:

In a first case of receiving no machine release signal rls and receiving a new request req at one time, the master count unit 124 sources a counter value corresponding to the master count mc to the local count unit 125 associated to that machine used for the new request and then increments the master count mc by one subsequently.

In a second case of receiving a machine release signal rls and no new request req at one time, the master count unit 124 decrements the master count mc by one.

In a third case of receiving a machine release signal rls and a new request req at one time, the master count unit 124 sources a counter value corresponding to the master count mc decremented by one (mc-1) to the local count unit 125 associated to the machine used for the new request.

After the respective local count unit 125 set its local count lc to the counter value of the master count mc, the local count unit 125 may detect machine release signals rls, and, if the counter value of a detected machine release signal rls is smaller than its local count lc, the local count unit 125 decreases its local count lc by one (lc-1). Further, the machine 131-13N being allocated to the new request is configured to transmit a request valid signal rv1 to the first arbiter 122 after resolving all dependencies of the new request, for example dependent write requests. The machine 131-13N may be further configured to keep the request valid signal rv1 active until it is selected by the first arbiter 122 for issuing the new request on the serving interconnect 300. The machine 131-13N may be further configured to reset the request valid signal rv1, if it is selected by the first arbiter 122, and further configured to wait for the allocated response from the serving interconnect 300 subsequently.

The respective machine 131-13N may be further configured, after receiving an acknowledgment (Ack) and associated data for the issued request from the serving interconnect 300, to transmit a response valid signal rv2 to the second arbiter 123. After receiving a negative acknowledgment (NAck) for the issued request from the serving interconnect 300, the machine 131-13N may be configured to set the request valid signal rv1 again. Moreover, the first arbiter 122 may be configured to select the machine 131-13N having the lowest local count lc in the tracking unit 121 and an active request valid signal rv1. Furthermore, the second arbiter 123 is configured to select the machine 131-13N having the lowest local count lc in the tracking entity 121 and an active response valid signal rv2.

Figure 4:
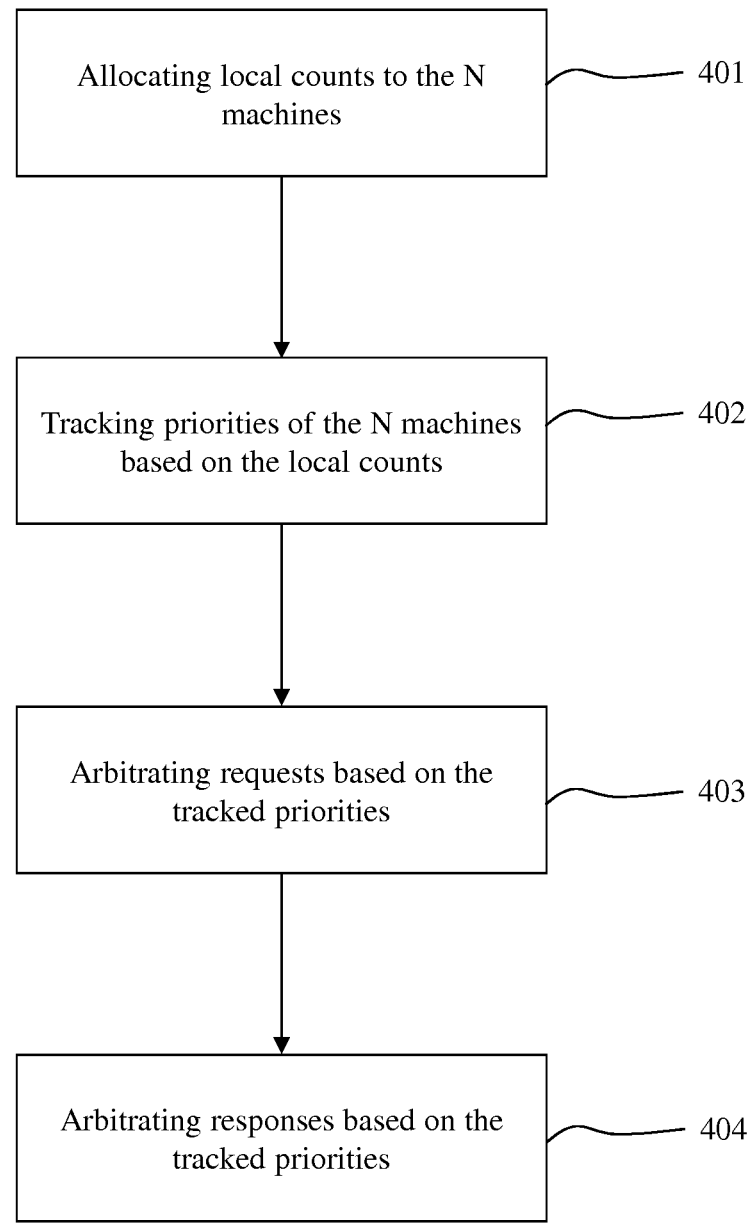
FIG. 4 shows an embodiment of a sequence of method operations for coupling a requesting interconnect and a serving interconnect.

In FIG. 4, an embodiment of a sequence of method operations for coupling a requesting interconnect 200 and a serving interconnect 300 connected to a number of coherent units 401-404, 500 in a computer system by a bridge 100 is shown. The bridge 100 has N machines 131-13N, 141-14M for handling requests from the requesting interconnect 200 and for handling allocated responses from the serving interconnect 300. Examples for such a bridge are shown in FIGS. 2 and 3.

The method of FIG. 4 has the following method operations 401 to 404:

In operation 401, a local count lc is allocated to each of the N machines. In operation 402, priorities of the N machines 131-13N, 141-14M for issuing received requests to the serving interconnect 300 and for issuing received responses to the requesting interconnect 200 are tracked based on the N local counts lc. In operation 403, the received requests to be issued to the serving interconnect 300 are arbitrated based on the tracked priorities. In operation 404, the received responses to be issued to the requesting interconnect 200 are arbitrated based on the tracked priorities.

Figure 5:
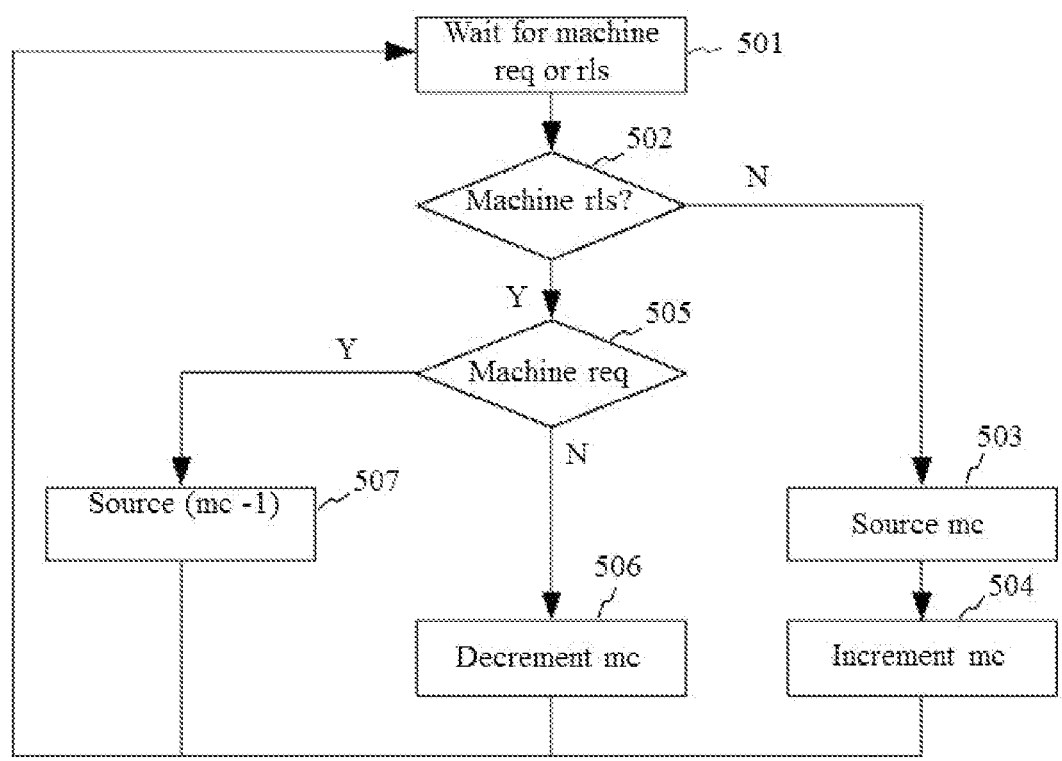
FIG. 5 shows an embodiment of a sequence of method operations for setting the master count in the bridge.

FIG. 5 shows an embodiment of a sequence of method operations for setting the master count mc in the bridge 100.

In operation 501, it is waited for a valid machine request req from the south ingress port or a machine release signal rls from the south egress port. In operation 502, it is checked if a received command is a machine release rls or not. For the negative case in operation 502, the method proceeds with operation 503 and assumes that the received command was a machine request. In operation 503, a counter value corresponding to the master count mc is sourced to the local count unit associated to that machine used for the new request. In operation 504, the master count mc is incremented by one. In operation 505, it is checked if a machine request was received additionally to the received machine release. In the negative case, the method proceeds with operation 506 and in the positive case the method proceeds with operation 507. In operation 506, the master count mc is decremented by one (mc-1). In operation 507, a counter value corresponding to the master count decremented by one (mc-1) is sourced to the local count unit 125 associated to the machine used for the new request.

Figure 6:
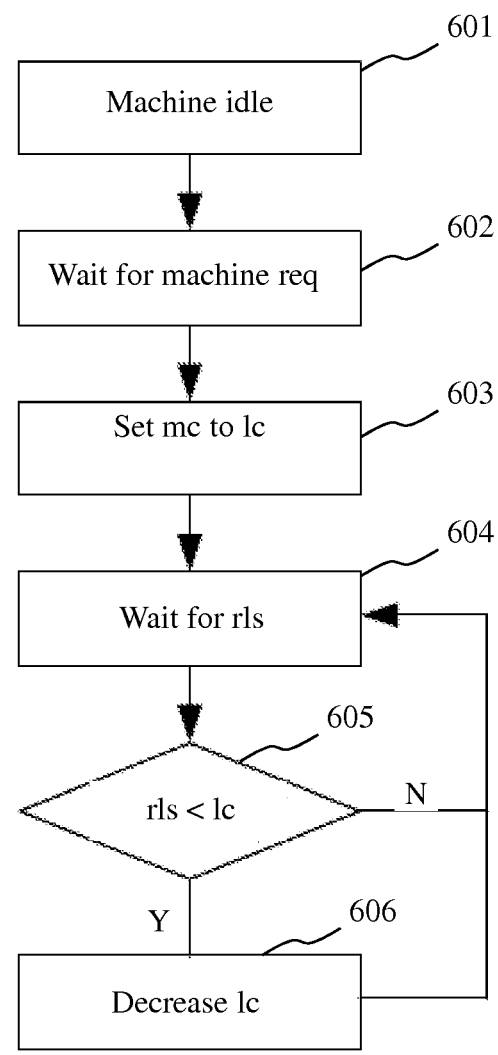
FIG. 6 shows an embodiment of a sequence of method operations for setting the local count for one machine.

The bookkeeping for the local count lc in one machine is shown in FIG. 6. In operation 601, the machine is idle. In operation 602, the machine waits for a machine request (req). In operation 603, when a new machine request is received at the machine, the machine used for serving this request stores the counter value provided by the master count as local count. Afterwards, in operation 604, it is waited for a machine release signal rls created by a logic attached to the south egress port of the bridge 100. If it detects a machine release signal rls with a counter value that is smaller than its local count lc in operation 605, the local count lc is decreased by one in operation 606. These operations may continue until the machine successfully transferred its data on the south egress interface and is freed up so that it can serve new requests.

Figure 7:
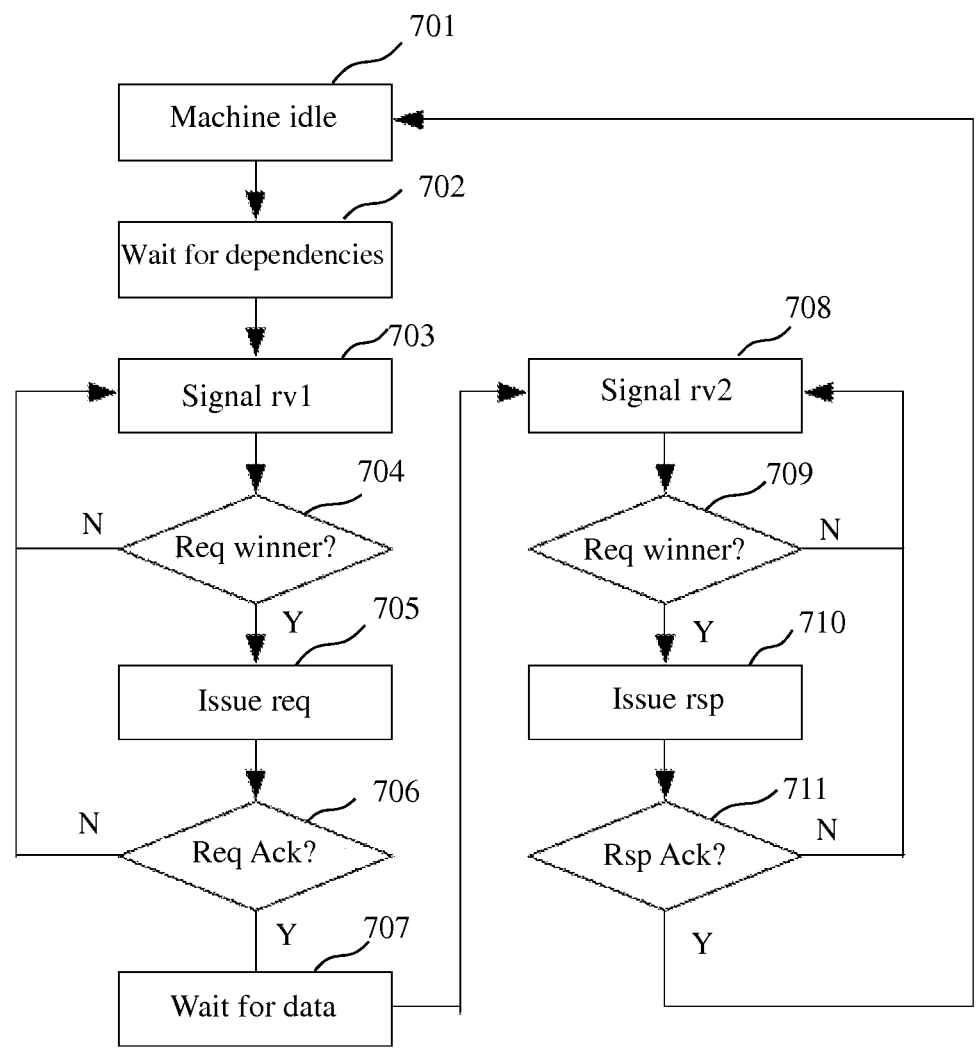
FIG. 7 shows an embodiment of a sequence of method operations for operating a read machine.

FIG. 7 shows an embodiment of a sequence of method operations for operating a read machine, i.e., the execution of a read request using the local count lc for request arbitration. In operation 701, the machine is idle, and then the machine is allocated for a read request. At the same time, the local count lc is provided by the master count unit. In operation 702, it is waited that all dependencies on the received request are resolved. For example, dependencies on writes are logged. When the dependencies are resolved, the request valid signal rv1 is set to "1" and transferred to the first arbiter 122 in operation 703. As a result, the machine is considered for arbitration for selecting the next command on the north egress interface of the bridge 100.

In operation 704, the first arbiter selects the lowest local count lc with an active request valid signal rv1 as request winner (req winner). The machine keeps the request valid signal rv1 active until it is selected for issuing the request on the coherent interconnect. When it is selected, it issues the request req and resets the request valid signal rv1. In operation 706, the machine waits for the request acknowledgment Req Ack from the coherent interconnect.

If it receives the Req Ack from the coherent interconnect, it waits for the data in operation 707 and proceeds to requesting arbitration for the south egress data return by setting the response valid signal rv2 to "1" in operation 708. Otherwise, if it receives a negative acknowledgment NAck from the coherent interconnect in operation 706, it starts over by setting the request valid signal rv1 again. Then, the method turns back to operation 703. The machine has then a lower counter value than new requests that are received by the bridge 100 at the later point in time than its own request, and thus it will also be scheduled for sending its retry request with higher priority.

The same procedure is replicated for the operation on the response side as shown in the right section of FIG. 7. The second arbiter 123 selects the machine with the lowest local count lc and an active response valid signal rv2. The winning machine issues its response in operation 710 and subsequently waits for the acknowledgment Rsp Ack or negative acknowledgment in operation 711. In case of a negative acknowledgement, the method returns to operation 708. In the case of an acknowledgement Rsp Ack, the machine is freed up and put into idle state (operation 701).

In sum, the ordering within the response priority selection mechanism is also stable in the presence of machine release signals rls. That is, the order in which the machines are arbitrated is stable also in the presence of a machine release signal rls, as that one will affect all machines alike.

Figure 8:
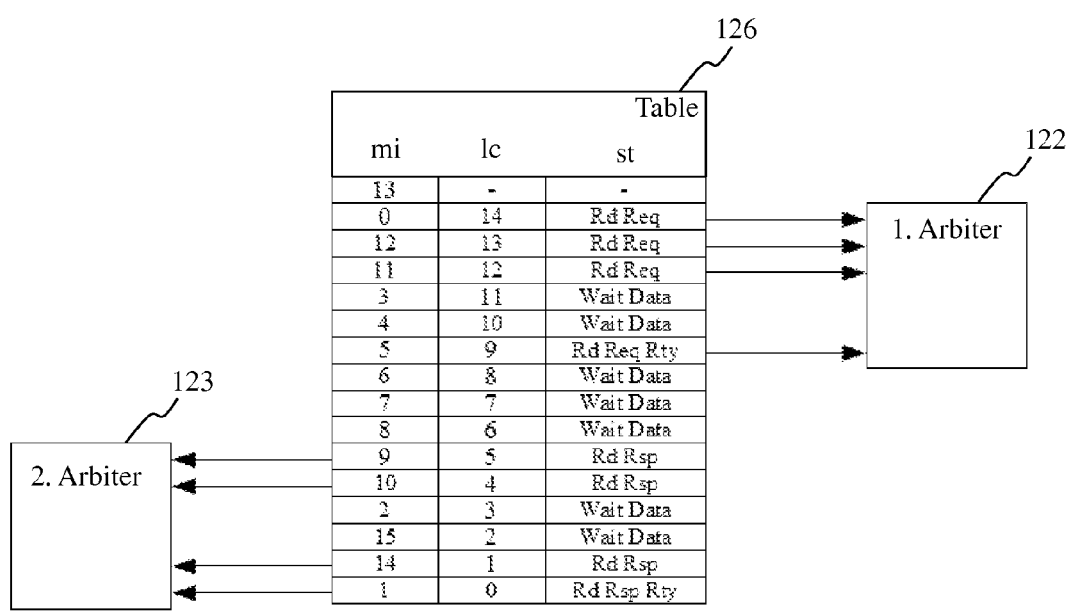
FIG. 8 shows a schematic block diagram of an embodiment of a table representing contents of the tracking entity.

FIG. 8 shows a schematic block diagram of an embodiment of a table 126 representing contents of the tracking entity 121. In particular, FIG. 8 shows a counter example with the machine identifier mi identifying the respective machine 131-13N, 141-14M, the local count lc and the state st of the machine 131-13N, 141-14M. The table 126 may be used as a distributed system in the bridge 100. Further, it may be used as a central entity in the bridge 100.

The table 126 of FIG. 8 shows that the local count lc determines the prioritization for request and response arbitrations. Therefore, the machine identifier mi may be arbitrary. In the example of FIG. 8, the state st may be ready to issue a read request: Rd Req, waiting for data: Wait Data, ready for retry of a read request: Rd Req Rty, ready for issuing a read response: Rd Rsp and ready for issuing a read response retry Rd Rsp Rty.

For the example of FIG. 8, on the request side, there are four machines with a valid request signal, namely the machines with mi=9, mi=10, mi=14, and mi=1. These machines are considered for arbitration. Three of these machines have their initial read request and one (mi=1) with a read response retry Rd Rsp Rty. The local counts lc in the example of FIG. 8 show that the retried machines, here the machines with mi=1 for the response and mi=5 for the request, always have lower local counts lc than initial requests and are therefore selected with priority over the first. On the other hand, machines waiting for data are not considered for arbitration on either interface.

On the response side, machines that received their data ahead of machines that were used before them but are still waiting for their data to return, for example due to different latencies in the serving coherent interconnect, are considered for scheduling as soon as their data is available, in the example of FIG. 8 those are the machines with mi=10 and mi=9. However, as soon as the read data arrives for machines allocated earlier (machines with mi=2 and mi=15), they would take priority in the response winner selection mechanism. Retried read response will arrive at having the lowest local count and will therefore take highest priority in the response arbitration for resending their response data.

Figure 9:
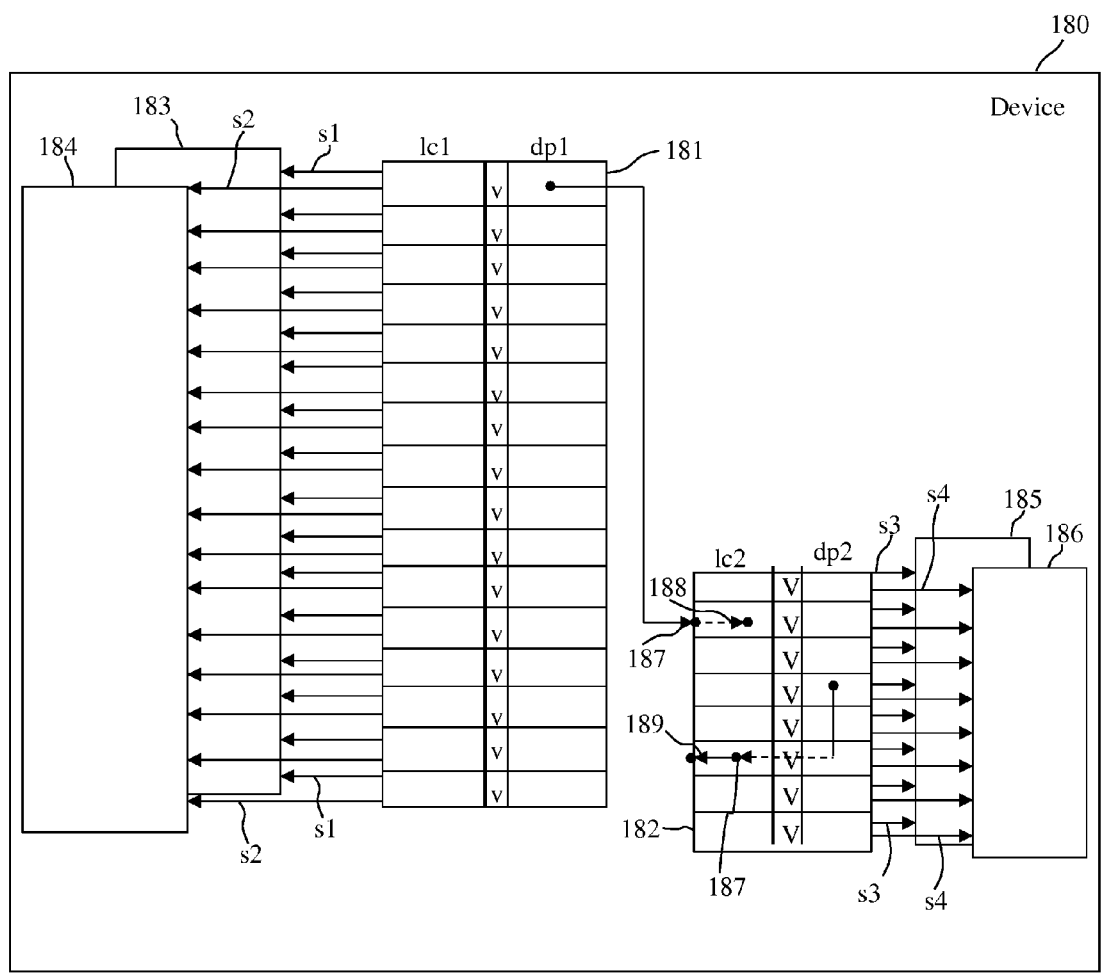
FIG. 9 shows a schematic block diagram of an embodiment of a device for read and write ordering.

FIG. 9 shows a schematic block diagram of an embodiment of a device 180 for read and write ordering. The device 180 includes a read ordering table 181, a write ordering table 182, a selecting unit 183 for selecting the read request winner, a selecting unit 184 for selecting the read response winner, a selecting unit 185 for selecting the write request winner, and an inverse dependent logic 186 for determining the dependencies.

The read ordering table 181 has N rows for the N machines and three columns. The first column of table 181 stores a read local count lc1. The third column stores a dependency tag indicating a write dependency of the read. The dependency tag dp1 may be indexed by the machine identifier mi or by the read local count lc1. The second column of table 181 stores a valid signal v for dp1. The selecting unit 183 for selecting the read request winner receives N signals s1. The respective signal s1 includes the read local count lc1 of the respective machine and the request valid signal rv1 of the respective machine. Based on the N signals s1, the unit 183 selects the request winner.

The selecting unit 184 is adapted to select the read response winner and receives N signals s2. The respective signal s2 includes the read local count lc1 of the respective machine and the response valid signal rv2. The selecting unit 185 is adapted to select the write request winner and is adapted to receive signals s3 from the write ordering table 182. The respective signal s3 includes a write local count lc2 of the machine and the request valid signal rv1 of the machine. Further, the inverse dependency logic 186 is adapted to determine the dependencies. For that, the inverse dependency logic 186 receives signals s4 from the write ordering table 182. The respective signal s4 is a valid signal indicating that the actual stream tag for a new request matches the stream tag of the respective machine.

As a result, the counter scheme of the device 180 of FIG. 9 may be used both for ordering of load (read) and store (write) operations. On the store side based on the write ordering table 182, the selecting unit 185 and the inverse dependency logic 186, it can also be used to maintain write—after—write ordering. On the read side based on the read ordering table 181, the selecting unit 183 and the selecting unit 184, it can be used for maintaining read—after—write ordering. If all writes are strictly ordered and separate master counts are used for reads and writes, the dependency for new requests, both read and writes, would always be the write machine with the counter value of write mc-1.

If multi streams are supported, an additional tag, for example a stream tag, may be passed on with reads and writes indicating the stream it is associated with. For determining the dependencies if present, the inverse dependency logic 186 may be used. Therefore, the stream tag is broadcast to all write machines and the write machine with the highest local count lc2 is the depending machine for the new request.

For tracking the dependencies, the machine can either be referenced by the local count (lc1 for table 181; lc2 for table 182) or by the machine identifier mi, as the dependencies are not changing over time. However, using the local count lc1, lc2 has the advantage that a single value needs to be broadcast on completion of a write among the write machines. When the depending write has successfully completed, the valid bit can be reset and the machine can request arbitration.

For example, if the write local count lc2 is used for keeping track of depending writes, the write local count lc2 is broadcast when a write machine received a clean combined response from the coherent interconnect. Moreover, the arrows 187 and 188 in FIG. 9 show that the write dependency dp1 may be indexed by the machine identifier (see arrow 187) or by the write local count lc2 (see arrow 188). Further, the arrows 189 and 190 in FIG. 9 show that for write after write dependencies, the dependency dp2 may be indexed by the machine identifier mi (see arrow 189) or by the write local count lc2 (see arrow 190).

Computerized devices may be suitably designed for implementing embodiments of the present invention as described herein. In that respect, it may be appreciated that the methods described herein are largely non-interactive and automated. In exemplary embodiments, the methods described herein may be implemented either in an interactive, partly-interactive or non-interactive system. The methods described herein may be implemented in software (e.g., firmware), hardware, or a combination thereof. In exemplary embodiments, the methods described herein are implemented in software, as an executable program, the latter executed by suitable digital processing devices. In further exemplary embodiments, at least one operation or all operations of above method of FIG. 4, 5 or 6 may be implemented in software, as an executable program, the latter executed by suitable digital processing devices. More generally, embodiments of the present invention may be implemented wherein general-purpose digital computers, such as personal computers, workstations, etc., are used.

Figure 10:
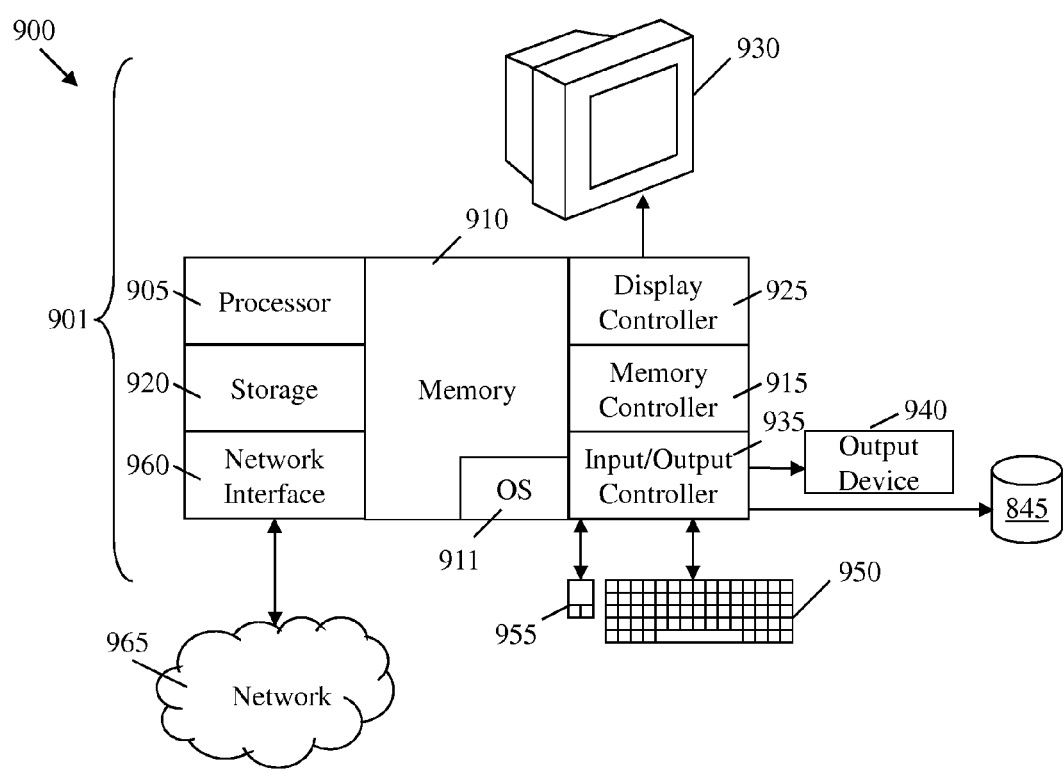
FIG. 10 shows a schematic block diagram of an embodiment of a system adapted for coupling a requesting interconnect and a serving interconnect.

For instance, the system 900 depicted in FIG. 10 schematically represents a computerized unit 901, e.g., a general-purpose computer. In exemplary embodiments, in terms of hardware architecture, as shown in FIG. 10, the unit 901 includes a processor 905, memory 910 coupled to a memory controller 915, and one or more input and/or output (I/O) devices 940, 945, 950, 955 (or peripherals) that are communicatively coupled via a local input/output controller 935. Further, the input/output controller 935 may be, but is not limited to, one or more buses or other wired or wireless connections, as is known in the art. The input/output controller 935 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 905 is a hardware device for executing software, particularly that stored in memory 910. The processor 905 may be any custom made or commercially available processor, a central processing unit (CPU), an auxiliary processor among several processors associated with the computer 901, a semiconductor based microprocessor (in the form of a microchip or chip set), or generally any device for executing software instructions.

The memory 910 may include any one or combination of volatile memory elements (e.g., random access memory) and nonvolatile memory elements. Moreover, the memory 910 may incorporate electronic, magnetic, optical, and/or other types of storage media. Note that the memory 910 may have a distributed architecture, where various components are situated remote from one another, but may be accessed by the processor 905.

The software in memory 910 may include one or more separate programs, each of which comprises an ordered listing of executable instructions for implementing logical functions. In the example of FIG. 10, the software in the memory 910 includes methods described herein in accordance with exemplary embodiments and a suitable operating system (OS) 911. The OS 911 essentially controls the execution of other computer programs, such as the methods as described herein (e.g., FIG. 4, 5 or 6), and provides scheduling, input-output control, file and data management, memory management, and communication control and related services. For example, the interface 1 may be embodied in the OS 911.

The methods described herein may be in the form of a source program, executable program (object code), script, or any other entity comprising a set of instructions to be performed. When in a source program form, then the program needs to be translated via a compiler, assembler, interpreter, or the like, as known per se, which may or may not be included within the memory 910, so as to operate properly in connection with the OS 911. Furthermore, the methods may be written as an object oriented programming language, which has classes of data and methods, or a procedure programming language, which has routines, subroutines, and/or functions.

Possibly, a conventional keyboard 950 and mouse 955 may be coupled to the input/output controller 935. Other I/O devices 940-955 may include sensors (especially in the case of network elements), i.e., hardware devices that produce a measurable response to a change in a physical condition like temperature or pressure (physical data to be monitored). Typically, the analog signal produced by the sensors is digitized by an analog-to-digital converter and sent to controllers 935 for further processing. Sensor nodes are ideally small, consume low energy, are autonomous and operate unattended.

In addition, the I/O devices 940-955 may further include devices that communicate both inputs and outputs. The system 900 may further include a display controller 925 coupled to a display 930. In exemplary embodiments, the system 900 may further include a network interface or transceiver 960 for coupling to a network 965.

The network 965 transmits and receives data between the unit 901 and external systems. The network 965 is possibly implemented in a wireless fashion, e.g., using wireless protocols and technologies, such as WiFi, WiMax, etc. The network 965 may be a fixed wireless network, a wireless local area network (LAN), a wireless wide area network (WAN) a personal area network (PAN), a virtual private network (VPN), intranet or other suitable network system and includes equipment for receiving and transmitting signals.

The network 965 may also be an IP-based network for communication between the unit 901 and any external server, client and the like via a broadband connection. In exemplary embodiments, network 965 may be a managed IP network administered by a service provider. Besides, the network 965 may be a packet-switched network such as a LAN, WAN, Internet network, etc.

If the unit 901 is a PC, workstation, intelligent device or the like, the software in the memory 910 may further include a basic input output system (BIOS). The BIOS is stored in ROM so that the BIOS may be executed when the computer 901 is activated.

When the unit 901 is in operation, the processor 905 is configured to execute software stored within the memory 910, to communicate data to and from the memory 910, and to generally control operations of the computer 901 pursuant to the software. The methods described herein and the OS 911, in whole or in part are read by the processor 905, typically buffered within the processor 905, and then executed. When the methods described herein (e.g., with reference to FIG. 4, 5 or 6 are implemented in software, the methods may be stored on any computer readable medium, such as storage 920, for use by or in connection with any computer related system or method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects.

Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the unit 901, partly thereon, partly on a unit 901 and another unit 901, similar or not.

Aspects of the present invention are described above with reference to flowchart illustrations and/or block diagrams of methods, apparatus (systems) and computer program products according to embodiments of the invention. It will be understood that each block of the flowchart illustrations and/or block diagrams may be implemented by one or more computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be loaded onto a computer, other programmable data processing apparatus, or other devices to cause a series of operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved and algorithm optimization. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

More generally, while the present invention has been described with reference to certain embodiments, it will be understood by those skilled in the art that various changes may be made and equivalents may be substituted without departing from the scope of the present invention. In addition, many modifications may be made to adapt a particular situation to the teachings of the present invention without departing from its scope. Therefore, it is intended that the present invention not be limited to the particular embodiments disclosed, but that the present invention will include all embodiments falling within the scope of the appended claims.

REFERENCE NUMERALS 10 bridge
11 I/O bridge
12 I/O host stack
100 bridge
110 interface
111 first buffer
112 second buffer
113 third buffer
114 fourth buffer
120 issuer
121 tracking entity
122 first arbiter
123 second arbiter
124 master count unit
125 local count unit
126 table
131-13N read machine
141-14M write machine
150 second interface
151 first buffer
152 second buffer
153 third buffer
154 fourth buffer
160 read data buffer
170 write data buffer
180 device for read and write ordering
181 read ordering table
182 writer ordering table
183 selecting unit
184 selecting unit
185 selecting unit
186 inverse dependency logic
187 arrow
188 arrow
189 arrow
190 arrow
200 requesting interconnect
300 serving interconnect
401-404 processing unit
500 microcontroller
dp1 dependencies
dp2 dependencies
lc local count
lc1 read local count
lc2 write local count
mc master count
mi machine identifier
req request
res response
rls machine release signal
rv1 request valid signal
rv2 response valid signal
st state

The invention claimed is:

1. A bridge for coupling a requesting interconnect and a serving interconnect connected to a number of coherent units in a computer system, the bridge comprising:
N machines configured to handle requests from the requesting interconnect and for handling allocated responses from the serving interconnect, wherein each of the N machines has an allocated local count;
a tracking entity configured to track priorities of the N machines for issuing received requests to the serving interconnect and for issuing received responses to the requesting interconnect based on the N local counts;
a first arbiter configured to arbitrate the received requests to be issued to the serving interconnect based on the tracked priorities; and
a second arbiter configured to arbitrate the received responses to be issued to the requesting interconnect based on the tracked priorities,
wherein the machine being allocated to a new request is configured to transmit a request valid signal to the first arbiter after resolving all dependencies of the new request, and wherein one or more of
- the first arbiter is configured to select the machine having the lowest local count in the tracking entity and an active request valid signal, and
- the second arbiter is configured to select the machine having the lowest local count in the tracking entity and an active response valid signal.

2. The bridge of claim 1, wherein the tracking entity is configured to track the priorities of the N machines for issuing the received requests to the serving interconnect and for issuing the received responses to the requesting interconnect based on the N local counts and a status of each of the N machines.

3. The bridge of claim 1, wherein the N local counts of the N machines are embodied as N consecutive numbers.

4. The bridge of claim 1, further comprising an issuer configured to control the N machines in order to issue the received requests to the serving interconnect and to issue the received responses to the requesting interconnect, wherein the issuer includes the first arbiter and the second arbiter.

5. The bridge of claim 4, further comprising a master count unit configured to provide a master count being based on a number of active machines of the N machines.

6. The bridge of claim 5, wherein the issuer includes a local count unit for each of the N machines, wherein the local count unit is configured to set the local count for its associated machine, if it is used for a new request, to a counter value of the master count.

7. The bridge of claim 6, wherein the master count unit is further configured to:
- in case of receiving no machine release signal and receiving a new request at one time, source a counter value corresponding to the master count to the local count unit associated to the machine used for the new request and to increment the master count by one subsequently;
- in case of receiving a machine release signal and no new request at one time, decrement the master count by one; and
- in case of receiving a machine release signal and a new request at one time, source a counter value corresponding to the master count decremented by one to the local count unit associated to the machine used for the new request.

8. The bridge of claim 6, wherein the local count unit is configured, after it set its local count to the counter value of the master count, to detect machine release signals and, if the counter value of a detected machine release signal is smaller than its local count, to decrease its local count by one.

9. The bridge of claim 1, wherein the machine is further configured to keep the request valid signal active until it is selected by the first arbiter for issuing the new request on the serving interconnect.

10. The bridge of claim 9, wherein the machine is configured to reset the request valid signal, if it is selected by the first arbiter, and further configured to wait for the allocated response from the serving interconnect subsequently.

11. The bridge of claim 10, wherein the machine is further configured to:
- after receiving an acknowledgement and allocated data for the issued request from the serving interconnect, transmit a response valid signal to the second arbiter; and
- after receiving a negative-acknowledgement for the issued request from the serving interconnect, to set the request valid signal again.

12. The bridge of claim 1, wherein the tracking entity includes a table having N rows for the N machines and at least two columns, wherein, in each of the N rows, the local count of the machine is stored in a column and the status of the machine is stored in a further column.

* * * * *